3,147,289
NEW STEROID HORMONE ESTER

Albert Wettstein, Riehen, and Georg Anner and Ludwig Ehmann, Basel, Switzerland, assignors to Ciba Corporation, New York, N.Y., a corporation of Delaware
No Drawing. Filed Jan. 4, 1963, Ser. No. 249,341
Claims priority, application, Switzerland,
Jan. 19, 1962, 659/62
1 Claim. (Cl. 260—397.4)

The present invention provides a process for the manufacture of the new, pharmacologically active undecylenic acid ester of $\Delta^1$-5$\alpha$-androstene-17$\beta$-ol-3-one.

After a single intramuscular injection this ester produces in the castrated male rat a high and prolonged anabolic effect and is in this respect superior to the other esters such as the propionate, isobutyrate, trimethylacetate, valerate and others. Also compared with other known testosterone derivatives having a high anabolic action it likewise offers certain advantages; thus, for example, it has a stronger anabolic effect in the above rat test than 19-nor-testosterone phenylpropionate and such effect is sustained over a longer period. The undecylenic ester of $\Delta^1$-5$\alpha$-androstene-17$\beta$-ol-3-one also shows a high degree of dissociation between the anabolic and the androgenic activity, the former eliciting good anabolic responses at dosage levels at which the androgenic response is very slight. Strong androgenic effects combined with strong anabolic effects occur at higher dosage levels. Furthermore it has the advantage of having only a minimal action on the endometrium of the estrogen-sensitized uterus of castrated rabbits and on the uterus of castrated rats in comparison to other known testosterone derivatives. The new ester therefore constitutes an excellent medicament for treatment in all cases in which a high and protracted anabolic effect is required. The new ester is also suitable for use in veterinary medicine.

The ester of the present invention is manufactured by known methods. Inter alia, it is of advantage to esterify $\Delta^1$-5$\alpha$-androstene-17$\beta$-ol-3-one with undecylenic acid in known manner, for example in the presence of an esterifying condensing agent, such as a strong mineral acid, for example sulfuric acid, hydrochloric acid, trifluoracetic acid or paratoluenesulfonic acid, in an anhydrous medium. The esterification may alternatively be performed with a functional derivative of undecylenic acid (preferably a halide thereof) which is reacted with $\Delta^1$-5$\alpha$-androstene-17$\beta$-ol-3-one, if desired in the presence of a basic condensing agent, such as a tertiary base, preferably pyridine, in a suitable solvent or diluent, with special advantage in dimethylformamide. It is also possible to use a derivative of the $\Delta^1$-5$\alpha$-androstene-17$\beta$-ol-3-one, such as a 3-ketal or its bisulfite addition product for esterification with undecylenic acid. Ketals so obtained are then treated with a weak acid, for instance diluted acid under mild conditions so as to leave the ester radical intact. Bisulfite addition products of the obtained ester is split selectively in 3-position by using an organic or inorganic base under mild conditions, for instance, at room temperature. It is also possible to use transesterification methods, that is to say, to start from another ester of $\Delta^1$-5$\alpha$-androstane-17$\beta$-ol-3-one and have the ester rest replaced by that of undecylenic acid by treatment with the latter or a functional derivative thereof. According to another preferred method of manufacturing the new ester the starting material used is the known undecylenate of dihydrotestosterone into which the 1:2-double bond is introduced in known manner, for example by bromination and dehydrobromination. With this method there is generally first formed in the bromination step the bromine addition product with the ethylenic double bond. After the dehydrobromination in 1:2-position which can be performed, for instance, with an organic tertiary base such as collidine, any bromine atoms in the ester moiety can be removed by known methods, for instance, with zinc, to regenerate the double bond. Another method for introducing the double bond in 1-position of dihydrotesterone undecylenate is the dehydrogenation with selenium dioxide.

Another object of the present invention is pharmaceutical preparations containing the undecylenate of $\Delta^1$-5$\alpha$-androstene-17$\beta$-ol-3-one with a solid or liquid excipient which mixtures are prepared in known manner, for example with the use of organic or inorganic pharmaceutical excipients suitable for parenteral, enteral or local administration. Suitable excipients are substances that do not react with the ester, such as water, vegetable oils, benzyl alcohols, polyethylene glycols, gelatine, lactose, starches, magnesium stearate, talc, white petroleum jelly, cholesterol or other medicinal excipients. Preferred preparations are those suitable for parenteral administration, more especially solutions, above all oily or aqueous solutions, also suspensions, emulsions or depot preparations; for enteral administration there are manufactured in similar manner also tablets or dragées, and for local application also ointments or creams. The preparations may be sterilized or they may contain assistants, such as preserving, stabilizing, wetting or emulsifying agents, salts for regulating the osmotic pressure, or buffers. Said preparations, for example an ampoule, preferably contain for instance 0.5 to 50 mg. of active substance.

The following examples illustrate the invention.

Example 1

11.54 grams of $\Delta^1$-5$\alpha$-androstene-17$\beta$-ol-3-one are dissolved with stirring under nitrogen in 150 cc. of pure, dry dimethylformamide at 20 to 25° C. The resulting clear solution is mixed within 10 to 15 minutes with 10 grams of undecylenyl chloride and then, for rinsing, with 50 cc. of pure, dry dimethylformamide at an internal temperature of 20 to 25° C. The clear reaction solution is then kept for 43 hours at 20 to 25° C. under nitrogen. The progress of the esterification is checked by way of thin-layer chromatography. After 43 hours a specimen of the reaction solution no longer reveals any free $\Delta^1$-5$\alpha$-androstene-17$\beta$-ol - 3 - one (paper-chromatography performed on silica gel as support; eluants: benzene+ethyl acetate 3:7 and chloroform+acetone 95:5; indicator: sulfuric acid of 50% strength).

To work up the clear reaction solution it is successively diluted with 100 cc. of water, whereupon at about 35° C. the reaction product separates with evolution of heat and turns smeary. The whole is left to itself for several hours at room temperature, then extracted with 3 x 500 cc. of ether, and the ethereal extract is successively agitated with 2 x 250 cc. of water, 2 x 200 cc. of 2 N-sodium hydroxide solution with addition of 50 cc. of saturated sodium chloride solution on each occasion to break the emulsion formed, and finally with 4 x 200 cc. of water. The washed ether extract is dried over calcined sodium sulfate, filtered and completely evaporated. The residue (15.3 grams of a yellow, thickly liquid oil) is dissolved in 100 cc. of hexane and chromatographed in hexane on 210 grams of alumina (activity III). The chromatogram is eluted with 1.5 litres of hexane and the resulting hexane fraction is concentrated to 25 cc., whereupon after cooling with ice-water $\Delta^1$-5α-androstene-17β-ol-3-one - 17 - undecylenate of the formula

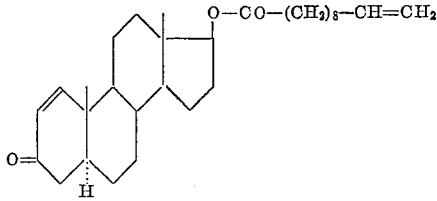

crystallizes in small needles melting at 47.5–48° C. Yield: 4.4 grams. Ultra-violet maximum at 230 mμ (in ethanoyl); $\epsilon=10,900$. $[\alpha]_D^{25°}=+36°\pm1°$ (c.=1% in dioxane).

Example 2

Pharmaceutical preparations for the parenteral administration of $\Delta^1$-5α-androstene-17β-ol-3-one-17-undecylenate in the form of an oily injection solution. There are prepared ampoules each containing

| | |
|---|---|
| $\Delta^1$-5α-androstene - 17β - ol - 3 - one - 17 - undecylenate _____mg__ | 10 |
| Sesame oil _____ccm__ | 1 |

They are manufactured for instance in the following manner:

100 mg. of the active substance are dissolved in 5 cc. of pure acetone, the acetone is then evaporated, the residue is dissolved by heating for 2 hours in purified sesame oil, and the volume of the solution is made up to 10 cc. The solution is then filtered through a sterilized glass sinter suction filter having large pores, charged into ten 1 cc.-ampoules and the latter are then sterilized in conventional manner.

Example 3

There are prepared in the same manner as described in the preceding example oil ampoules for injection containing each 25 mg. of $\Delta^1$-5α-androstene-17β-ol-3-one-17-undecylenate in 1 ccm. of sesame oil.

What is claimed is:

The undecylenic acid ester of $\Delta^1$-5α-androstene-17β-ol-3-one.

References Cited in the file of this patent
UNITED STATES PATENTS

| | | |
|---|---|---|
| 2,851,454 | Pappo et al. _____ | Sept. 9, 1958 |
| 2,888,474 | Ringold et al. _____ | May 26, 1959 |